United States Patent
Ngo et al.

(10) Patent No.: US 10,516,428 B1
(45) Date of Patent: Dec. 24, 2019

(54) RADIO FREQUENCY FRONT-END SLAVE CIRCUIT AND RELATED APPARATUS

(71) Applicant: Qorvo US, Inc., Greensboro, NC (US)

(72) Inventors: Christopher Truong Ngo, Queen Creek, AZ (US); Jean-Frederic Chiron, Tournefeuille (FR); Nadim Khlat, Cugnaux (FR); William David Southcombe, San Diego, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/395,680

(22) Filed: Apr. 26, 2019

(51) Int. Cl.
*H04B 1/18* (2006.01)
*G06F 13/42* (2006.01)

(52) U.S. Cl.
CPC ........... *H04B 1/18* (2013.01); *G06F 13/4291* (2013.01)

(58) Field of Classification Search
CPC .............................. H04B 1/18; G06F 13/4291
See application file for complete search history.

(56) References Cited

U.S. PATENT DOCUMENTS

2013/0262710 A1* 10/2013 Luo .................... H01Q 1/243
710/9
2017/0192918 A1* 7/2017 Tenbroek ............ G06F 13/4291

OTHER PUBLICATIONS

Author Unknown, "Specification for RF Front-End Control Interface (RFFE)," Version 2.1, Dec. 18, 2017, MIPI Alliance, Inc., 230 pages.

* cited by examiner

*Primary Examiner* — Nguyen T Vo
(74) *Attorney, Agent, or Firm* — Withrow & Terranova, P.L.L.C.

(57) ABSTRACT

A radio frequency front-end (RFFE) slave circuit and related apparatus are provided. The RFFE slave circuit may be coupled to a number of RFFE masters over an RFFE bus. The RFFE slave circuit may be configured by the RFFE masters for accessing, either concurrently or alternately, a number of sharable circuits in an envelope tracking (ET) circuit. The RFFE slave circuit may include common configuration circuitry configured to set a common configuration parameter(s) for a concurrently sharable circuit(s) in the ET circuit. The RFFE slave circuit may include private configuration circuitry configured to set a private configuration parameter(s) for an alternately sharable circuit(s) in the ET circuit. By employing the RFFE slave circuit to set the common and/or private configuration parameter(s) for the ET circuit, it may be possible to reduce processing delays in the RFFE bus, thus helping to improve efficiency of the ET circuit and/or the power amplifier(s).

20 Claims, 4 Drawing Sheets

RADIO FREQUENCY FRONT-END SLAVE CIRCUIT AND RELATED APPARATUS

FIELD OF THE DISCLOSURE

The technology of the disclosure relates generally to a radio frequency (RF) circuit incorporating an RF front-end interface configured in accordance to MIPI® Alliance Specification for RF Front-End Control Interface (RFFE$^{SM}$).

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, sophisticated power amplifiers may be employed to increase output power of radio frequency (RF) signals (e.g., maintaining sufficient energy per bit) communicated by mobile communication devices. However, the increased output power of RF signals can lead to increased power consumption and thermal dissipation in mobile communication devices, thus compromising overall performance and user experiences.

Envelope tracking (ET) is a power management technology designed to improve efficiency levels of power amplifiers to help reduce power consumption and thermal dissipation in a mobile communication device. In an ET system, an ET circuit may be configured to provide a time-variant ET voltage to a power amplifier(s) for amplifying an RF signal(s). To achieve a desirable efficiency and linearity at the power amplifier(s), it may be necessary for the time-variant ET voltage to track closely with a time-variant power envelope of the RF signal(s). In this regard, the time-variant ET voltage should increase and decrease according to the rise and fall of the time-variant power envelope.

The RF signal(s), along with the time-variant power envelope, may be generated in a transceiver circuit(s) and provided to the ET circuit and/or the power amplifier(s). Typically, the transceiver circuit(s) is coupled to the ET circuit and/or the power amplifier(s) via a two-wire serial interface known as an RF front-end (RFFE) bus. In a non-limiting example, the transceiver circuit(s) can be configured to function as an RFFE master on one end of the RFFE bus, while the ET circuit and/or the power amplifier(s) are configured to function as an RFFE slave(s) on the other end of the RFFE bus. In this regard, to help maintain close alignment between the time-variant ET voltage and the time-variant power envelope, it may be desired to minimize processing latencies associated with the RFFE bus.

SUMMARY

Aspects disclosed in the detailed description include a radio frequency front-end (RFFE) slave circuit and related apparatus. In a non-limiting example, the RFFE slave circuit is coupled to a number of RFFE masters over an RFFE bus. In examples discussed herein, the RFFE slave circuit can be configured by the RFFE masters for accessing, either concurrently or alternately, a number of sharable circuits in an envelope tracking (ET) circuit. The RFFE slave circuit may include common configuration circuitry configured to set a common configuration parameter(s) for a concurrently sharable circuit(s) in the ET circuit. The RFFE slave circuit may also include private configuration circuitry configured to set a private configuration parameter(s) for an alternately sharable circuit(s) in the ET circuit. By employing the RFFE slave circuit to set the common and/or private configuration parameter(s) for the ET circuit, it may be possible to eliminate a high-level entity (HLE), which is typically required for RFFE bus arbitration in a conventional RFFE configuration. As a result, it may be possible to reduce a processing delay in the RFFE bus, thus helping to improve efficiency of the ET circuit and/or the power amplifier(s).

In one aspect, an RFFE slave circuit is provided. The RFFE slave circuit includes common configuration circuitry coupled to an RF circuit comprising at least one first sharable circuit and at least one second sharable circuit. The common configuration circuitry is configured to cause the at least one first sharable circuit to operate based on at least one common configuration parameter. The RFFE slave circuit also includes first private configuration circuitry configured to set at least one first private configuration parameter corresponding to the at least one second sharable circuit. The RFFE slave circuit also includes second private configuration circuitry configured to set at least one second private configuration parameter corresponding to the at least one second sharable circuit. The RFFE slave circuit also includes arbitration circuitry coupled to the RF circuit and configured to cause the at least one second sharable circuit to operate based on at least one selected private configuration parameter among the at least one first private configuration parameter and the at least one second private configuration parameter.

In another aspect, an RFFE apparatus is provided. The RFFE apparatus includes an ET circuit. The ET circuit includes a first tracker circuit configured to generate a first ET voltage. The ET circuit also includes a second tracker circuit configured to generate a second ET voltage. The ET circuit also includes at least one first sharable circuit and at least one second sharable circuit configured to be shared between the first tracker circuit and the second tracker circuit. The RFFE apparatus also includes an RFFE slave circuit. The RFFE slave circuit includes common configuration circuitry coupled to the ET circuit and configured to cause the at least one first sharable circuit to operate based on at least one common configuration parameter. The RFFE slave circuit also includes first private configuration circuitry configured to set at least one first private configuration parameter corresponding to the at least one second sharable circuit. The RFFE slave circuit also includes second private configuration circuitry configured to set at least one second private configuration parameter corresponding to the at least one second sharable circuit. The RFFE slave circuit also includes arbitration circuitry coupled to the ET circuit and configured to cause the at least one second sharable circuit to operate based on at least one selected private configuration parameter among the at least one first private configuration parameter and the at least one second private configuration parameter.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1:
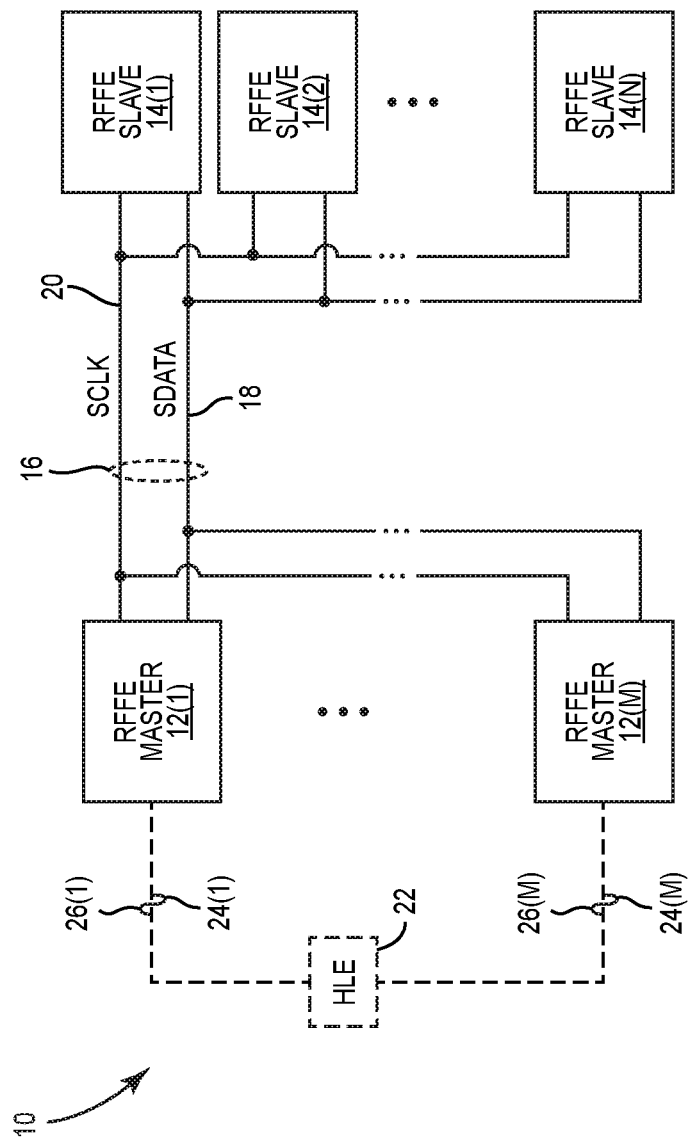
FIG. 1 is a schematic diagram of an exemplary multi-master radio frequency front-end (RFFE) bus structure as defined in the MIPI® alliance specification for RF front-end control interface, version 2.1.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a radio frequency front-end (RFFE) slave circuit and related apparatus. In a non-limiting example, the RFFE slave circuit is coupled to a number of RFFE masters over an RFFE bus. In examples discussed herein, the RFFE slave circuit can be configured by the RFFE masters for accessing, either concurrently or alternately, a number of sharable circuits in an envelope tracking (ET) circuit. The RFFE slave circuit may include common configuration circuitry configured to set a common configuration parameter(s) for a concurrently sharable circuit(s) in the ET circuit. The RFFE slave circuit may also include private configuration circuitry configured to set a private configuration parameter(s) for an alternately sharable circuit(s) in the ET circuit. By employing the RFFE slave circuit to set the common and/or private configuration parameter(s) for the ET circuit, it may be possible to eliminate a high-level entity (HLE), which is typically required for RFFE bus arbitration in a conventional RFFE configuration. As a result, it may be possible to reduce the processing delay in the RFFE bus, thus helping to improve efficiency of the ET circuit and/or the power amplifier(s).

Before discussing the RFFE slave circuit of the present disclosure, an introduction of a multi-master RFFE interface and bus structure, as defined by the MIPI® alliance specification for RF front-end control interface, version 2.1 (hereinafter "RFFE specification"), is first provided with reference to FIG. 1. A brief overview of an existing RF apparatus that may be configured to function based on the multi-master RFFE interface and bus structure is then provided in FIG. 2. The discussion of specific exemplary aspects of an RFFE slave circuit of the present disclosure and an RFFE-based ETIC incorporating the RFFE slave circuit starts below with reference to FIG. 3.

In this regard, FIG. 1 is a schematic diagram of an exemplary multi-master RFFE bus structure 10 as defined in the RFFE specification. The multi-master RFFE bus structure 10 includes a number of RFFE masters 12(1)-12(M) coupled to a number of RFFE slaves 14(1)-14(N) over an RFFE bus 16. According to the RFFE specification, the RFFE bus 16 is a two-wire serial bus that includes a data line 18 and a clock line 20 for communicating a bidirectional data signal SDATA and a clock signal SCLK, respectively.

Further according to the RFFE specification, only a single RFFE master among the RFFE masters 12(1)-12(M) may control the RFFE bus 16 at any given time. In other words, the RFFE masters 12(1)-12(M) are configured to communicate with the RFFE slaves 14(1)-14(N) in an alternate fashion. The RFFE specification assumes that the decision as to which of the RFFE masters 12(1)-12(M) can own the RFFE bus 16 is made outside the multi-master RFFE bus structure 10. More specifically, the RFFE specification assumes that a high-level entity (HLE) 22, which may represent an abstracted concept of a bus arbiter, can be employed outside the multi-master RFFE bus structure 10 to help decide which of the RFFE masters 12(1)-12(M) can control the RFFE bus 16 at any given time. The RFFE masters 12(1)-12(M) may be configured to request access to the RFFE bus 16 by sending a number of bus access requests 24(1)-24(M) to the HLE 22, respectively. Accordingly, the HLE 22 may provide a number of bus access responses 26(1)-26(M) as response to the bus access requests 24(1)-24(M), respectively. Collectively, the bus access responses 26(1)-26(M) provide an indication as to which of the RFFE masters 12(1)-12(4) is granted access to the RFFE bus 16 at any given time.

The HLE 22, which is typically enabled by a software function, may introduce considerable amount of processing delay in receiving/processing the bus access requests 24(1)-24(M) and/or distributing the bus access responses 26(1)-26(M). As a result, the RFFE masters 12(1)-12(M) may be delayed in getting access to the RFFE bus 16 to carry out time-critical communication with the RFFE slaves 14(1)-14(N).

Figure 2:
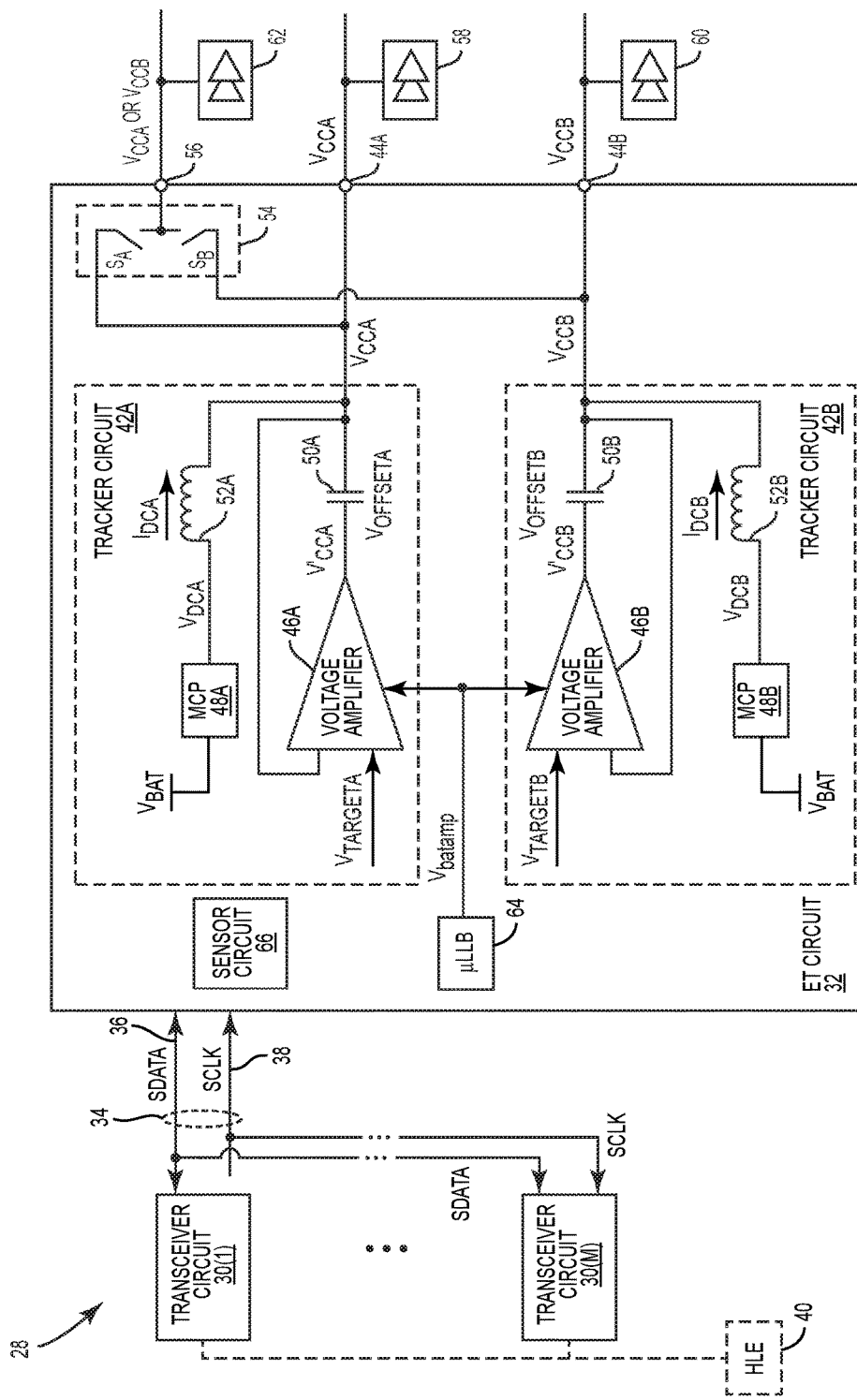
FIG. 2 is a schematic diagram of an exemplary existing RF apparatus in which a number of transceiver circuits are coupled to an envelope tracking (ET) circuit via an RFFE bus and configured to function as multiple RFFE masters.

According to the RFFE specification, the RFFE bus 16 can be used to connect one or more RF integrated circuits (RFICs) to related front-end modules (FEMs) in an electronic apparatus, such as a mobile communication device. In this regard, FIG. 2 is a schematic diagram of an exemplary existing RF apparatus 28 in which a number of transceiver circuits 30(1)-30(M) are coupled to an ET circuit 32 via an RFFE bus 34 configured to function as multiple RFFE masters.

Similar to the RFFE bus 16 in FIG. 1, the RFFE bus 34 is also a two-wire serial bus that includes a data line 36 and a clock line 38 for communicating a bidirectional data signal SDATA and a clock signal SCLK, respectively. Accordingly, the transceiver circuits 30(1)-30(M) need to take turns to communicate with the ET circuit 32. In this regard, the existing RF apparatus 28 may rely on an HLE 40, which is functionally equivalent to the HLE 22 in FIG. 1, to help determine which of the transceiver circuits 30(1)-30(M) gets access to the RFFE bus at any given time.

The ET circuit 32 includes a first tracker circuit 42A and a second tracker circuit 42B that are coupled to a first primary port 44A and a second primary port 44B, respectively. The first tracker circuit 42A includes a first voltage amplifier 46A and a first multi-level charge pump (MCP) 48A. The second tracker circuit 42B includes a second voltage amplifier 46B and a second MCP 48B.

The first voltage amplifier 46A is configured to generate a first initial ET voltage $V'_{CCA}$ based on a first ET target voltage $V_{TARGETA}$. The first voltage amplifier 46A may be coupled to the first primary port 44A via a first offset capacitor 50A, which is configured to raise the first initial ET voltage $V'_{CCA}$ by a first offset voltage $V_{OFFSETA}$ (e.g., 0.8 V) to generate the first ET voltage $V_{CCA}$ ($V_{CCA}=V'_{CCA}+V_{OFFSETA}$). The first MCP 48A is configured to generate a first constant voltage $V_{DCA}$ based on a battery voltage $V_{BAT}$. The first MCP 48A may be coupled to the first primary port 44A via a first inductor 52A, which is configured to induce a first low-frequency current $I_{DCA}$ (e.g., a direct current) based on the first constant voltage $V_{DCA}$.

The second voltage amplifier 46B is configured to generate a second initial ET voltage $V'_{CCB}$ based on a second ET target voltage $V_{TARGETB}$. The second voltage amplifier 46B may be coupled to the second primary port 44B via a second offset capacitor 50B, which is configured to raise the second initial ET voltage $V'_{CCB}$ by a second offset voltage $V_{OFFSETB}$ (e.g., 0.8 V) to generate the second ET voltage $V_{CCB}$ ($V_{CCB}=V'_{CCB}+V_{OFFSETB}$). The second MCP 48B is configured to generate a second constant voltage $V_{DCB}$ based on the battery voltage $V_{BAT}$. The second MCP 48B may be coupled to the second primary port 44B via a second inductor 52B, which is configured to induce a second low-frequency current $I_{DCB}$ (e.g., a direct current) based on the second constant voltage $V_{DCB}$.

The ET circuit 32 includes an auxiliary switching circuit 54 coupled to an auxiliary port 56. The auxiliary switching circuit 54 includes a first switch $S_A$ and a second switch $S_B$. In one example, the first switch $S_A$ and the second switch $S_B$ can be closed and opened, respectively, to output the first ET voltage $V_{CCA}$ at the auxiliary port 56. In another example, the first switch $S_A$ and the second switch $S_B$ can be opened and closed, respectively, to output the second ET voltage $V_{CCB}$ at the auxiliary port 56. In a non-limiting example, the first primary port 44A, the second primary port 44B, and the auxiliary port 56 can be coupled to a first primary amplifier circuit 58, a second primary amplifier circuit 60, and an auxiliary amplifier circuit 62, respectively.

The first voltage amplifier 46A and the second voltage amplifier 46B are further configured to generate the first initial ET voltage $V'_{CCA}$ and the second initial ET voltage $V'_{CCB}$, respectively, based on a supply voltage $V_{batamp}$. In this regard, the ET circuit 32 can be configured to include a micro inductance-based buck-boost (μLBB) circuit 64 configured to provide the supply voltage $V_{batamp}$ to the first voltage amplifier 46A and the second voltage amplifier 46B.

The ET circuit 32 may include sensor circuitry 66, which may include a variety of sensors (e.g., temperature sensor, current sensor, etc.). The sensor circuitry 66 may be utilized by the first tracker circuit 42A and the second tracker circuit 42B to perform a variety of measurements in the ET circuit 32.

Given that the μLBB circuit 64, the auxiliary switching circuit 54, and the sensor circuitry 66 may be shared between the first tracker circuit 42A and the second tracker circuit 42B, the μLBB circuit 64, the auxiliary switching circuit 54, and the sensor circuitry 66 are collectively referred to as sharable circuits hereinafter. The μLBB circuit 64 may be used concurrently by the first tracker circuit 42A and the second tracker circuit 42B. In this regard, the μLBB circuit 64 may be further referred to as a concurrently-sharable circuit. In contrast, the auxiliary switching circuit 54 and the sensor circuitry 66 can only be utilized by one of the first tracker circuit 42A and the second tracker circuit 42B at any given time. In this regard, the auxiliary switching circuit 54 and the sensor circuitry 66 may be further referred to as alternately-sharable circuits. Notably, the μLBB circuit 64, the auxiliary switching circuit 54, and the sensor circuitry 66 are merely non-limiting examples of the sharable circuits in the ET circuit 32. It should be appreciated that the ET circuit 32 can be configured to include more concurrently-sharable and/or alternately-sharable circuits as needed.

In a non-limiting example, the first tracker circuit 42A and the second tracker circuit 42B can be controlled by the transceiver circuit 30(1) and the transceiver circuit 30(M), respectively. In this regard, the transceiver circuit 30(1) may communicate to the first tracker circuit 42A for accessing the sharable circuits. Likewise, the transceiver circuit 30(M) may communicate to the second tracker circuit 42B for accessing the sharable circuits. As discussed earlier, the transceiver circuit 30(1) and the transceiver circuit 30(M) rely on the HLE 40 to obtain access to the RFFE bus 34. Given that the HLE 40 can introduce significant processing delay in determining which of the transceiver circuit 30(1) and the transceiver circuit 30(M) can access the RFFE bus 34 at any given time, the transceiver circuit 30(1) and the transceiver circuit 30(M) may be unable to communicate with the first tracker circuit 42A and/or the second tracker circuit 42B in a timely manner to carry out time-critical functions. As such, it may be desired to eliminate the HLE 40 in the existing RF apparatus 28 to help improve responsiveness of the transceiver circuits 30(1)-30(M).

Figure 3:
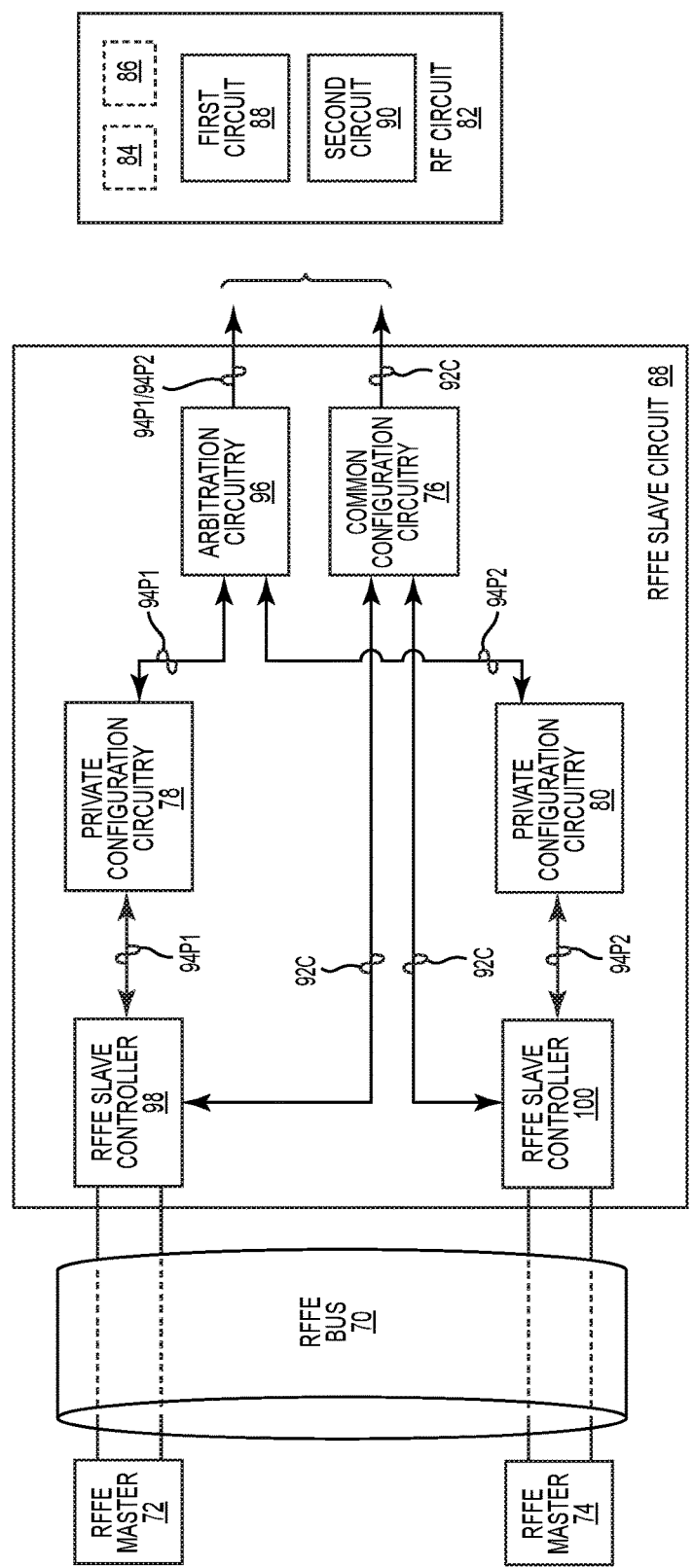
FIG. 3 is a schematic diagram of an exemplary RFFE slave circuit configured according to an embodiment of the present disclosure to reduce delay associated with accessing an RFFE bus.

In this regard, FIG. 3 is a schematic diagram of an exemplary RFFE slave circuit 68 configured according to an embodiment of the present disclosure to eliminate the HLE 40 in the existing RF apparatus 28 of FIG. 2 to help reduce delay associated with accessing an RFFE bus 70. In a non-limiting example, the RFFE slave circuit 68 is coupled to a first RFFE master 72 and a second RFFE master 74 via the RFFE bus 70 based on the RFFE specification. In this regard, the RFFE slave circuit 68 may be coupled to additional RFFE masters in accordance to the multi-master RFFE bus structure 10 of FIG. 1. As discussed in detail below, by replacing the HLE 40 with the RFFE slave circuit 68, it may be possible to reduce the processing delay associated with the HLE 40, thus helping to reduce an access delay in the RFFE bus 70.

The RFFE slave circuit 68 includes common configuration circuitry 76, first private configuration circuitry 78, and second private configuration circuitry 80. Each of the common configuration circuitry 76, the first private configuration circuitry 78, and the second private configuration circuitry 80 may include a register(s) for storing a configuration parameter(s). It should be appreciated that the common configuration circuitry 76, the first private configuration circuitry 78, and the second private configuration circuitry 80 are merely discussed as non-limiting examples. In this regard, the RFFE slave circuit 68 may be configured to include additional common configuration circuitries and/or private configuration circuitries as needed.

The RFFE slave circuit 68 can be coupled to an RF circuit 82 that includes at least one first sharable circuit 84 and at least one second sharable circuit 86. In a non-limiting example, the first sharable circuit 84 corresponds to the μLBB circuit 64 in the ET circuit 32 of FIG. 2 and the second sharable circuit 86 can correspond to the auxiliary switching circuit 54 and/or the sensor circuitry 66 in the ET circuit 32. The RF circuit 82 may include a first circuit 88 and a second circuit 90 that correspond respectively to the first tracker circuit 42A and the second tracker circuit 42B in the ET circuit 32.

According to the previous discussion in FIG. 2, the first sharable circuit 84 is a concurrently-sharable circuit that can be utilized concurrently by the first circuit 88 and the second circuit 90. In this regard, the first sharable circuit 84 can be referred to as a "common sharable circuit." In a non-limiting example, the common configuration circuitry 76 can be configured to provide at least one common configuration parameter 92C for configuring the first sharable circuit 84 (the common sharable circuit). Accordingly, the first circuit 88 and the second circuit 90 may access the first sharable circuit 84 concurrently based on the common configuration parameter 92C.

The second sharable circuit 86 is an alternately-sharable circuit that can be utilized by either the first circuit 88 or the second circuit 90 at any given time. As such, the second sharable circuit 86 can be referred to as a "private sharable circuit." In a non-limiting example, the first private configuration circuitry 78 can be configured to provide at least one first private configuration parameter 94P1 for operating the second sharable circuit 86 (private sharable circuit) by the first circuit 88. The second private configuration circuitry 80 can be configured to provide at least one second private configuration parameter 94P2 for operating the second sharable circuit 86 (private sharable circuit) by the second circuit 90. Accordingly, the first circuit 88 and the second circuit 90 may access the second sharable circuit 86 alternately based on the first private configuration parameter and the second private configuration parameter, respectively.

The RFFE slave circuit 68 includes arbitration circuitry 96 that is coupled to the first private configuration circuitry 78 and the second private configuration circuitry 80. The arbitration circuitry 96 can be configured to determine which of the first circuit 88 and the second circuit 90 gets access to the second sharable circuit 86 at any given time. Accordingly, the arbitration circuitry 96 may output at least one selected private configuration parameter among the first private configuration parameter 94P1 and the second private configuration parameter 94P2. More specifically, the arbitration circuitry 96 can be configured to allow the first circuit 88 and the second circuit 90 to access the second sharable circuit 86 by outputting the first private configuration parameter 94P1 and the second private configuration parameter 94P2, respectively. The arbitration circuitry 96 may be configured to arbitrate based on any suitable algorithm, such as round robin (RR), priority scheduling, shortest remaining time, and so on.

The first circuit 88 and the second circuit 90 may be controlled by the first RFFE master 72 and the second RFFE master 74, respectively. In this regard, the RFFE slave circuit 68 may include a first RFFE slave controller 98 and a second RFFE slave controller 100 that are coupled to the first RFFE master 72 and the second RFFE master 74 via the RFFE bus 70. In one example, the first RFFE slave controller 98 and the second RFFE slave controller 100 can be coupled to the first RFFE master 72 and the second RFFE master 74, respectively. In another example, the first RFFE slave controller 98 can be coupled to both the first RFFE master 72 and the second RFFE master 74. In another example, the second RFFE slave controller 100 can be coupled to both the first RFFE master 72 and the second RFFE master 74. In this regard, the first RFFE slave controller 98 and the second RFFE slave controller 100 may be configured to operate concurrently or independently.

In a non-limiting example, the first RFFE slave controller 98 receives the first private configuration parameter 94P1 from the first RFFE master 72 and the second RFFE slave controller 100 receives the second private configuration parameter 94P2 from the second RFFE master 74. Accordingly, the first RFFE slave controller 98 and the second RFFE slave controller 100 may store the first private configuration parameter 94P1 and the second private configuration parameter 94P2 in the first private configuration circuitry 78 and the second private configuration circuitry 80, respectively. The first RFFE slave controller 98 and/or the second RFFE slave controller 100 may receive the common configuration parameter 92C from the first RFFE master 72 and/or the second RFFE master 74. Accordingly, the first RFFE slave controller 98 and/or the second RFFE slave controller 100 may store the common configuration parameter 92C in the common configuration circuitry 76.

Notably, the first RFFE master 72 and the second RFFE master 74 may still need to take turns to communicate with the first RFFE slave controller 98 and/or the second RFFE slave controller 100 according to the RFFE specification. However, the first circuit 88 and the second circuit 90 may access the first sharable circuit 84 and/or the second sharable circuit 86 based on the common configuration circuitry 76 and/or the arbitration circuitry 96, independent of the RFFE bus 70. In this regard, the first circuit 88 and the second circuit 90 may no longer be affected by possible access delay associated with arbitrating the RFFE bus 70 between the first RFFE master 72 and the second RFFE master 74. Accordingly, the RFFE slave circuit 68 may be said to operate without requiring an HLE.

Figure 4:
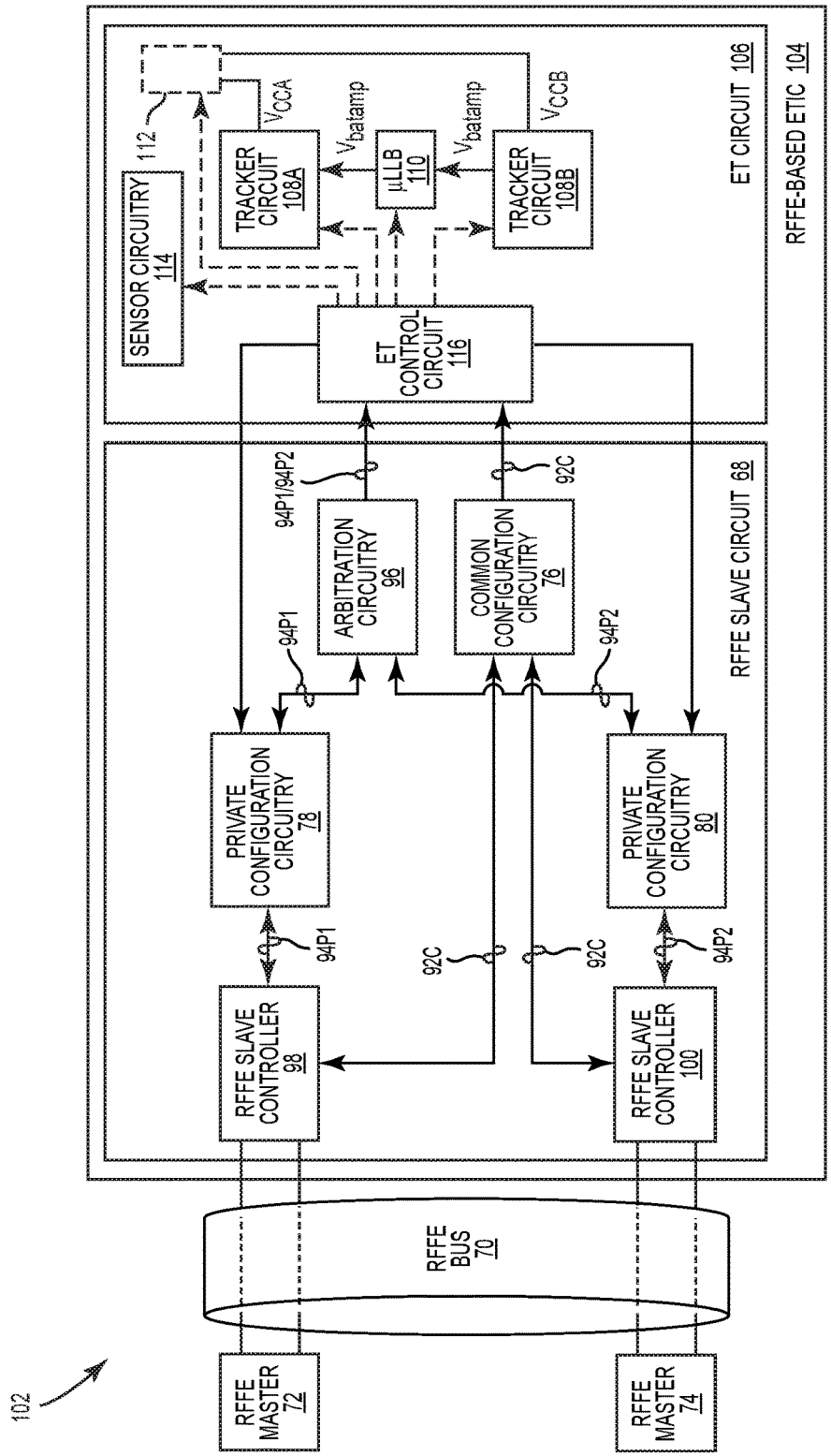
FIG. 4 is a schematic diagram of an exemplary RF apparatus configured to incorporate the RFFE slave circuit of FIG. 3 in an RFFE-based ET integrated circuit (ETIC).

In a non-limiting example, the RFFE slave circuit 68 can be provided in an RF apparatus configured to operate based on the RFFE specification. In this regard, FIG. 4 is a schematic diagram of an exemplary RFFE apparatus 102 configured to incorporate the RFFE slave circuit 68 of FIG. 3 in an RFFE-based ET integrated circuit (ETIC) 104. Common elements between FIGS. 3 and 4 are shown therein with common element numbers and will not be re-described herein.

The RFFE-based ETIC 104 may include an ET circuit 106 that is coupled to the RFFE slave circuit 68. The ET circuit 106 includes a first tracker circuit 108A and a second tracker circuit 108B that are functionally equivalent to the first tracker circuit 42A and the second tracker circuit 42B in FIG. 2, respectively. The ET circuit 106 includes a μLBB circuit 110, an auxiliary switching circuit 112, and sensor circuitry 114 that are functionally equivalent to the μLBB circuit 64, the auxiliary switching circuit 54, and the sensor circuitry 66 in FIG. 2, respectively. In this regard, the μLBB circuit 110 corresponds to the first sharable circuit 84 in FIG. 3, while the auxiliary switching circuit 112 and the sensor circuitry 114 correspond to the second sharable circuit 86 in FIG. 3.

The ET circuit 106 includes an ET control circuit 116, which can include a microprocessor(s), a microcontroller(s), a field-programmable gate array(s) (FPGA(s)), or a combination thereof. The ET control circuit 116 can be coupled to the common configuration circuitry 76 and the arbitration circuitry 96 in the RFFE slave circuit 68.

In one non-limiting example, the ET control circuit 116 may retrieve the common configuration parameter 92C (e.g., dithering and frequency) from the common configuration circuitry 76 and configure the μLBB circuit 110 to provide a common supply voltage $V_{batamp}$ to the first tracker circuit 108A and the second tracker circuit 108B. As discussed in FIG. 2, the first tracker circuit 108A and the second tracker circuit 108B can be configured to generate the first ET voltage $V_{CCA}$ and the second ET voltage $V_{CCB}$ for the first primary amplifier circuit 58 and the second primary amplifier circuit 60, respectively. Notably, the first primary amplifier circuit 58 and the second primary amplifier circuit 60 may each be configured to operate based on a respective time-variant power envelope that rises and falls over time. Accordingly, the first tracker circuit 108A and the second tracker circuit 108B may need to generate the first ET voltage $V_{CCA}$ and the second ET voltage $V_{CCB}$ that track the respective time-variant power envelope.

As such, the μLBB circuit 110 may need to generate the common supply voltage $V_{batamp}$ as a highest supply voltage required to generate the first ET voltage $V_{CCA}$ and the second ET voltage $V_{CCB}$. For example, the first tracker circuit 108A and the second tracker circuit 108B require 2.1 V and 1.8 V of supply voltages, respectively. Accordingly, the ET control circuit 116 needs to configure the μLBB circuit 110 to generate the common supply voltage $V_{batamp}$ at 2.1 V. In case the first tracker circuit 108A is deactivated, the ET control circuit 116 can then configure the μLBB circuit 110 to generate the common supply voltage $V_{batamp}$ at 1.8 V, thus helping to improve efficiency of the second tracker circuit 108B.

In a non-limiting example, the μLBB circuit 110 may be configured to depend on some private configuration parameters in addition to the common configuration parameter 92C. Such private configuration parameters may be so determined to prevent the first tracker circuit 108A and/or the second tracker circuit 108B from potential performance degradation, in addition to maintaining efficiency. For example, the private configuration parameters can help the ET control circuit 116 to determine the common supply voltage $V_{batamp}$ as well as timing for adjusting the common supply voltage $V_{batamp}$ for the first tracker circuit 108A and/or the second tracker circuit 108B. In this regard, the ET control circuit 116 may configure the first tracker circuit 108A or the second tracker circuit 108B further based on the first private configuration parameter 94P1 or the second private configuration parameter 94P2.

In another non-limiting example, the ET control circuit 116 receives the first private configuration parameter 94P1 or the second private configuration parameter 94P2 from the arbitration circuitry 96. The control circuit 116 may configure the first tracker circuit 108A to access the auxiliary switching circuit 112 and/or the sensor circuitry 114 in response to receiving the first private configuration parameter 94P1. Likewise, the ET control circuit 116 may configure the second tracker circuit 108B to access the auxiliary switching circuit 112 and/or the sensor circuitry 114 in response to receiving the second private configuration parameter 94P2.

Those skilled in the art will recognize improvements and modifications to the embodiments of the present disclosure. All such improvements and modifications are considered within the scope of the concepts disclosed herein and the claims that follow.

What is claimed is:

1. A radio frequency front-end (RFFE) slave circuit comprising:
   common configuration circuitry coupled to an RF circuit comprising at least one first sharable circuit and at least one second sharable circuit, the common configuration circuitry is configured to cause the at least one first sharable circuit to operate based on at least one common configuration parameter;
   first private configuration circuitry configured to set at least one first private configuration parameter corresponding to the at least one second sharable circuit;
   second private configuration circuitry configured to set at least one second private configuration parameter corresponding to the at least one second sharable circuit; and
   arbitration circuitry coupled to the RF circuit and configured to cause the at least one second sharable circuit to operate based on at least one selected private configuration parameter among the at least one first private configuration parameter and the at least one second private configuration parameter.

2. The RFFE slave circuit of claim 1 further comprising:
a first RFFE slave controller coupled to a first RFFE master via an RFFE bus; and
a second RFFE slave controller coupled to a second RFFE master via the RFFE bus.

3. The RFFE slave circuit of claim 2 wherein:
the first RFFE slave controller is configured to operate independently from the second RFFE slave controller; and
the second RFFE slave controller is configured to operate independently from the first RFFE slave controller.

4. The RFFE slave circuit of claim 2 wherein the first RFFE slave controller is configured to:
receive the at least one common configuration parameter from the first RFFE master; and
set the at least one common configuration parameter in the common configuration circuitry.

5. The RFFE slave circuit of claim 4 wherein the first RFFE slave controller is further configured to:
receive the at least one first private configuration parameter from the first RFFE master; and
set the at least one first private configuration parameter in the first private configuration circuitry.

6. The RFFE slave circuit of claim 2 wherein the second RFFE slave controller is configured to:
receive the at least one common configuration parameter from the second RFFE master; and
set the at least one common configuration parameter in the common configuration circuitry.

7. The RFFE slave circuit of claim 6 wherein the second RFFE slave controller is further configured to:
receive the at least one second private configuration parameter from the second RFFE master; and
set the at least one second private configuration parameter in the second private configuration circuitry.

8. A radio frequency front-end (RFFE) apparatus comprising:
an envelope tracking (ET) circuit comprising:
a first tracker circuit configured to generate a first ET voltage;
a second tracker circuit configured to generate a second ET voltage; and
at least one first sharable circuit and at least one second sharable circuit configured to be shared between the first tracker circuit and the second tracker circuit; and
an RFFE slave circuit comprising:
common configuration circuitry coupled to the ET circuit and configured to cause the at least one first sharable circuit to operate based on at least one common configuration parameter;
first private configuration circuitry configured to set at least one first private configuration parameter corresponding to the at least one second sharable circuit;
second private configuration circuitry configured to set at least one second private configuration parameter corresponding to the at least one second sharable circuit; and
arbitration circuitry coupled to the ET circuit and configured to cause the at least one second sharable circuit to operate based on at least one selected private configuration parameter among the at least one first private configuration parameter and the at least one second private configuration parameter.

9. The RFFE apparatus of claim 8 wherein the ET circuit comprises an ET control circuit configured to:
retrieve the at least one common configuration parameter from the common configuration circuitry;
configure the at least one first sharable circuit to operate based on the at least one common configuration parameter;
receive the at least one selected private configuration parameter from the arbitration circuitry; and
configure the at least one second sharable circuit to operate based on the at least one selected private configuration parameter.

10. The RFFE apparatus of claim 9 wherein:
the at least one first sharable circuit comprises a micro-inductance-based buck-boost (μLBB) circuit configured to provide a common supply voltage to the first tracker circuit and the second tracker circuit; and
the ET control circuit is further configured to configure the μLBB circuit to operate based on the at least one common configuration parameter.

11. The RFFE apparatus of claim 9 wherein:
the at least one second sharable circuit comprises an auxiliary switching circuit configured to selectively output the first ET voltage or the second ET voltage; and
the ET control circuit is further configured to configure the auxiliary switching circuit based on the at least one selected private configuration parameter.

12. The RFFE apparatus of claim 9 wherein:
the at least one second sharable circuit comprises sensor circuitry; and
the ET control circuit is further configured to configure the sensor circuitry based on the at least one selected private configuration parameter.

13. The RFFE apparatus of claim 8 wherein the first tracker circuit and the second tracker circuit are configured to:
share concurrently the at least one first sharable circuit based on the at least one common configuration parameter; and
share alternately the at least one second sharable circuit based on the at least one first private configuration parameter and the at least one second private configuration parameter, respectively.

14. The RFFE apparatus of claim 8 wherein the RFFE slave circuit further comprises:
a first RFFE slave controller coupled to a first RFFE master via an RFFE bus; and
a second RFFE slave controller coupled to a second RFFE master via the RFFE bus.

15. The RFFE apparatus of claim 14 wherein:
the first RFFE slave controller is configured to operate independently from the second RFFE slave controller; and
the second RFFE slave controller is configured to operate independently from the first RFFE slave controller.

16. The RFFE apparatus of claim 14 wherein the first RFFE slave controller is configured to:
receive the at least one common configuration parameter from the first RFFE master; and
set the at least one common configuration parameter in the common configuration circuitry.

17. The RFFE apparatus of claim 14 wherein the first RFFE slave controller is further configured to:
receive the at least one first private configuration parameter from the first RFFE master; and
set the at least one first private configuration parameter in the first private configuration circuitry.

18. The RFFE apparatus of claim 14 wherein the second RFFE slave controller is configured to:

receive the at least one common configuration parameter from the second RFFE master; and set the at least one common configuration parameter in the common configuration circuitry.

19. The RFFE apparatus of claim 18 wherein the second RFFE slave controller is further configured to:

receive the at least one second private configuration parameter from the second RFFE master; and set the at least one second private configuration parameter in the second private configuration circuitry.

20. The RFFE apparatus of claim 8 further comprising an ET integrated circuit (ETIC), the ETIC comprises the RFFE slave circuit and the ET circuit.

\* \* \* \* \*